United States Patent [19]
Bauer et al.

[11] Patent Number: 5,592,831
[45] Date of Patent: Jan. 14, 1997

[54] PROCESS FOR RECOVERING A PURE CARBON MONOXIDE FRACTION

[75] Inventors: Heinz Bauer, Ebenhausen; Rainer Fabian, Geretsried, both of Germany

[73] Assignee: Linde Aktiengesellschaft, Germany

[21] Appl. No.: 524,676

[22] Filed: Sep. 8, 1995

[30] Foreign Application Priority Data

Sep. 16, 1994 [DE] Germany ............... 44 33 114.2

[51] Int. Cl.$^6$ .................................................. F25J 3/00
[52] U.S. Cl. ..................... 62/625; 62/632; 62/920; 62/932
[58] Field of Search ................... 62/625, 632, 920, 62/932

[56] References Cited

U.S. PATENT DOCUMENTS

| | | | |
|---|---|---|---|
| 4,888,035 | 12/1989 | Bauer | 62/920 |
| 5,133,793 | 7/1992 | Billy | 62/920 |
| 5,351,491 | 10/1994 | Fabian | 62/920 |

FOREIGN PATENT DOCUMENTS

| | | |
|---|---|---|
| 0317851 | 5/1989 | European Pat. Off. . |
| 2323410 | 11/1973 | Germany . |

OTHER PUBLICATIONS

Dr. Ralph Berninger, "Fortschritte bei der H$_2$/CO–Tieftemperaturzerlegung", *Berichte Aus Technik Und Wissenschaft*, vol. 62:18–12, 1988.

Dipl.–Ing. Ranier Fabian, "Derzeitiger Stand der H$_2$–CO–Zerlegung mittels Tieftemperaturtechnik", *Berichte Aus Technik Und Wissenschalft*, vol. 55:38–42, 1984.

*Primary Examiner*—Ronald C. Capossela
*Attorney, Agent, or Firm*—Millen, White, Zelano & Branigan, P.C.

[57] ABSTRACT

In the recovery of a pure CO fraction from a charge containing hydrogen, carbon monoxide and methane from which water and carbon dioxide have optionally been removed, the charge is cooled and partially condensed; and the carbon monoxide is scrubbed out with supercooled liquid methane. The resultant hydrogen is stripped out, and the recovered CO/CH$_4$-rich fraction is separated by rectification to obtain a pure CO fraction and a CH$_4$-rich fraction. The supercooled liquid methane used as the scrubbing agent contains at least 2 to 15 mol % carbon monoxide, preferably 7 to 10 mol % carbon monoxide. Also, the hydrogen stripper and methane scrubbing column can be combined in a single column.

4 Claims, 1 Drawing Sheet

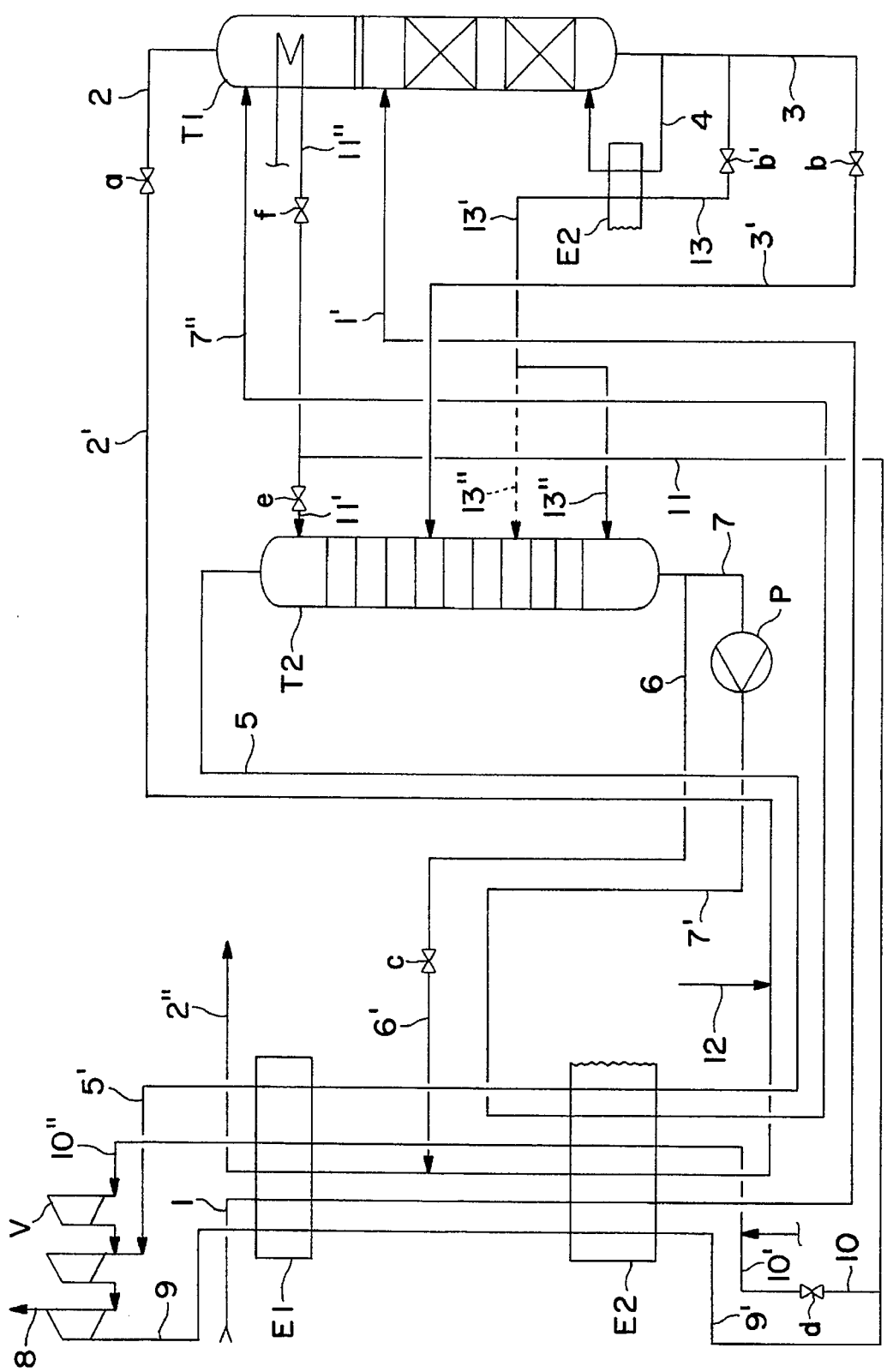

PROCESS FOR RECOVERING A PURE CARBON MONOXIDE FRACTION

BACKGROUND OF THE INVENTION

This invention relates to a process for recovering a pure CO fraction from a charge containing hydrogen, carbon monoxide and methane from which water and carbon dioxide have optionally been removed and is particular to a process wherein the charge is scrubbed with a supercooled liquid methane-containing stream, the resultant hydrogen being stripped out, and the resultant $CO/CH_4$-rich fraction is being separated by rectification to produce a pure CO fraction and a $CH_4$-rich fraction. The requirements of the term "pure" CO depends on the use of the CO, but in general, pure CO contains not more than 2000 mol-ppm.

As the result of increased purity requirements imposed on gaseous separation products, the increasing importance of the operating costs of a facility, and the continuous improvement of available thermodynamic data, a continuous technical evolution has taken place in the separation of $H_2/CO$ in recent years.

As in the past, steam reformer effluent is the main source of an $H_2/CO$ charge fraction. But also the gasification of heavy oil with oxygen—therefore partial oxidation—assuming an inexpensive oxygen source, has become important in recent years for providing an $H_2/CO$ supply.

Most of the carbon monoxide produced in this way is used in the production of formic and acetic acid. Another use is in polycarbonate chemistry, which requires high-purity phosgene which in turn requires extremely-high-purity carbon monoxide as a raw material. The methane content of the carbon monoxide here must be less than 10 mol-ppm, and the hydrogen content less than 1000 mol-ppm, preferably less than 100 mol-ppm. The hydrogen byproduct produced in the recovery of pure CO is used, optionally after subsequent fine purification, for a variety of hydrogenation purposes.

The articles of R. Fabian in LINDE Reports from Technik und Wissenschaft [Technology and Science] No. 55, 1984, pp. 38 to 42, and Dr. R. Berninger in LINDE Reports from Technik und Wissenschaft No. 62, 1988, pp. 18 to 23 provide a survey of the currently used processes for producing carbon monoxide with hydrogen as a byproduct. A process for the recovery of pure CO by means of methane scrubbing and integrated $N_2/CO$ separation is depicted in FIG. 6 and described in the pertinent description of the last-mentioned LINDE Report. In this known process, the carbon monoxide, hydrogen and nitrogen are scrubbed out of the gaseous charge gas in a first scrubbing column by means of supercooled liquid methane. In a downstream hydrogen stripping column, hydrogen is removed from the fraction drawn off at the bottom of the scrubbing column. The $H_2$-free mixture drawn off at the bottom of this stripping column is then separated in another separating column into an $N_2/CO$ fraction (top product) and a liquid $CH_4$ fraction (bottoms product). This liquid $CH_4$ fraction is pumped up to the raw gas pressure and delivered to the scrubbing column as scrubbing agent. In a fourth column, the $H_2/CO$ fraction is separated into a CO product fraction and an $N_2$-rich fraction. If the gaseous charge does not contain any nitrogen, this fourth column can be omitted. The heated CO product fraction is compressed together with the so-called circulating CO and delivered at the required product pressure. A carbon monoxide cycle with an expansion turbine is used to supply the cold values for this process.

To scrub out the carbon monoxide and nitrogen as completely as possible in the scrubbing column, it is necessary that the methane used as scrubbing agent be delivered in as pure a form as possible to the scrubbing column. To achieve a $CH_4$ purity as high as possible for the scrubbing agent, a high boiling power, i.e., a large amount of vapor, is necessary for mass transfer in that column in which the $CH_4$-rich fraction is recovered, thereby increasing the cost of the process.

SUMMARY OF THE INVENTION

An object of this invention therefore, is to provide a novel process and associated apparatus, so as to avoid the above-mentioned drawbacks of the prior art.

Upon further study of the specification and appended claims, further objects and advantages of this invention will become apparent to those skilled in the art.

To help achieve these objects, there is used a supercooled liquid methane scrubbing agent which contains at least 2 to 15 mol % carbon monoxide, preferably 7 to 10 mol % carbon monoxide.

BRIEF DESCRIPTION OF THE DRAWING

A more detailed explanation of the process according to the invention and the device according to the invention and other configurations thereof are explained in based on the FIGURE which is a schematic flowsheet of a prepared embodiment of the invention.

DETAILED DESCRIPTION OF THE FIGURE

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications cited above and below, and of corresponding German application P 4433114.2, are hereby incorporated by reference.

With reference to the FIGURE, the following table provides non-limiting examples of temperature, pressure, flow rate and the liquid proportion of the gases or gas mixtures in lines provided with reference numbers. (A liquid proportion of 1.0 means that the stream is entirely liquid.)

| Line | T[K] | p [bara*] | Flow Rate [Nm³/h] | Liquid Proportion |
|---|---|---|---|---|
| 1 | 308,0 | 13,1 | 2720 | 0,0 |
| 1' | 88,8 | 12,8 | 2720 | 0,118 |
| 2 | 94,0 | 12,7 | 2115 | 0,0 |
| 2' | 92,0 | 4,9 | 2115 | 0,0 |
| 2" | 300,0 | 4,5 | 2234 | 0,0 |
| 3 | 124,4 | 12,7 | 846 | 1,0 |
| 3' | 108,0 | 4,7 | 846 | 0,82 |
| 4 | 124,4 | 12,7 | 1789 | 1,0 |
| 5 | 97,4 | 4,5 | 831 | 0,0 |
| 5' | 305,0 | 4,1 | 831 | 0,0 |
| 6 | 125,7 | 4,7 | 756 | 0,0 |
| 6' | 125,0 | 4,6 | 756 | 1,0 |
| 7 | 125,7 | 4,7 | 726 | 0,98 |

-continued

| Line | T[K] | p [bara*] | Flow Rate [Nm³/h] | Liquid Proportion |
|---|---|---|---|---|
| 7' | 126,1 | 13,7 | 726 | 1,0 |
| 7" | 88,8 | 12,7 | 726 | 1,0 |
| 8 | 305,0 | 9,9 | 576 | 1,0 |
| 9 | 305,0 | 24,2 | 1049 | 0,0 |
| 9' | 88,8 | 24,0 | 1049 | 1,0 |
| 10 | 88,8 | 24,0 | 613 | 1,0 |
| 10' | 87,8 | 2,0 | 613 | 0,988 |
| 10" | 300,0 | 4,2 | 794 | 0,0 |
| 1 | 88,8 | 24,0 | 436 | 1,0 |
| 11' | 89,4 | 4,5 | 256 | 1,0 |
| 11" | 88,3 | 2,1 | 180 | 0,988 |
| 12 | 100,2 | 7,9 | 90 | 1,0 |
| 13 | 108,0 | 4,8 | 486 | 0,82 |
| 13' | 129,0 | 4,7 | 486 | 0,0 |

*bara = bar (absolute)

The FIGURE schematically shows a process for recovering a carbon monoxide product and a hydrogen by-product by separation of a charge which contains at least hydrogen, carbon monoxide and methane, this charge originating preferably from a steam reformer.

The charge from which optionally water and carbon dioxide have been removed by means of an adsorption process is routed via line 1 through two heat exchangers E1 and E2. The charge has a composition of 72.9 mol % $H_2$, 24.5 mol % CO, 2.4 mol % $CH_4$ and 0.3 mol % other components, such as, e.g., $N_2$. In the two heat exchangers, the charge is cooled to the extent that a large part of the carbon monoxide and methane condenses. The cooled and partially condensed charge is delivered via line 1' to the lower part of column T1 in its upper area. Column T1 represents a combination of a hydrogen stripper and a methane scrubbing column. In this case, according to the invention, the upper part of this column forms the methane scrubbing column, while the lower part of the column represents the hydrogen stripper. An $H_2$-rich fraction consisting of 93.7 mol % $H_2$, 4.2 mol % CO, 2.9 mol % $CH_4$ and 0.1 mol % $N_2$ is drawn off from column T1 at the top via line 2. This fraction is expanded in valve a and then routed via line 2' in counterflow to the process streams to be cooled through two heat exchangers E2 and E1. This $H_2$-rich fraction is delivered via line 2'. If desired, this $H_2$-rich fraction can also be heated separately under pressure and, e.g., subsequently purified by pressure swing adsorption into pure hydrogen or superpure hydrogen.

At the bottom of column T1, a $CO/CH_4$-rich fraction consisting of 46.8 mol % CO, 52.8 mol % $CH_4$ 0.4 mol % $N_2$ and 10 ppm $H_2$ is drawn off via line 3. Part of this fraction is vaporized via line 4 in a reboiler and then returned to the column. For the sake of clarity, at this point the FIGURE shows a heat exchanger as reboiler which is likewise designated E2 since heat exchangers E2 represent a single heat exchanger in the FIGURE.

The fraction drawn off from the bottom of column T1 travels via two paths to a $CO/CH_4$ separating column T2 which may be a bubble cap or packed column for example. Thus, a first part of this drawn off fraction is expanded in valve b—this part remaining almost entirely liquid—and is then delivered via line 3' to separating column T2. Another part is expanded in valve b' and delivered via line 13 to heat exchanger E2. In the latter, the fraction is entirely vaporized and then delivered via line 13' likewise to separating column T2, however below the feed point of the expanded substantially liquid, first partial flow. Via the top and by means of line 5, the pure carbon monoxide product fraction is drawn off from this separating column T2 and heated in counterflow to the process stream to be cooled in heat exchangers E1 and E2. This pure carbon monoxide fraction has a composition of 99.2 mol % CO, 0.8 mol % $N_2$ 23 ppm $H_2$ and 10 ppm $CH_4$. Theoretically, it is possible to separate the $H_2$ and $CH_4$ from the pure carbon monoxide fraction to any desired degree.

From the bottom of separating column T2, a $CH_4$-rich fraction is withdrawn consisting of 93.0 mol % $CH_4$, 7.0 mol CO and 0.04 mol % $N_2$. The part of this $CH_4$-rich fraction which is not necessary for scrubbing is delivered via line 6, expanded in valve c and then admixed via line 6' with the $H_2$-rich fraction in line 2'. Via line 2" an $H_2$-rich gas mixture consisting of 88.7 mol % $H_2$, 4.2 mol % CO, 2.9 mol % $CH_4$ and 0.9 mol % $N_2$ is delivered. The $CH_4$-rich fraction needed for scrubbing is supplied via line 7 to pump P in which it is pumped up to the new gas pressure. Then, the $CH_4$-rich fraction is supercooled in heat exchanger E2 and delivered via line 7" to the head of the upper part of column T1, i.e., the methane scrubbing column part. According to the invention, this supercooled $CH_4$-rich fraction which is used as scrubbing agent contains at least 2 to 15 mol % carbon monoxide, preferably 7 to 10 mol % carbon monoxide. This means that the boiling power in separating column T2 can be kept arbitrarily low. Under certain circumstances, it can even be omitted. For the sake of clarity, this is not shown in the FIGURE.

The energy required for the process according to the invention is made available by an additional CO cycle. For this reason, the pure carbon monoxide product fraction delivered via line 5' from heat exchanger E1 is supplied to the second stage of a three-stage piston compressor V. In this case, the first stage compresses to 4.5 bara the second stage to 10.0 bara and the third stage to 24.5 bara. The pure carbon monoxide product fraction can be drawn off after the second or third compressor stage. A partial flow, i.e., that which forms the carbon monoxide cooling cycle, is drawn off via line 9 after the third compressor stage, cooled in heat exchanger E1, condensed and supercooled in heat exchanger E2 and then routed via line 9' to a point at which this carbon monoxide faction is split. A first partial flow thereof is supplied via line 10 to valved and expanded in the latter. Then, this partial flow is routed via line 10' through heat exchangers E1 and E2 where it is vaporized and heated against the process flows to be cooled. This partial flow is then supplied via line 10" to the first compressor stage. The second partial flow is routed via line 11 to another point at which this partial flow is itself split. Some of this flow is expanded in valve e and delivered as reflux via line 11' to the head of separating column T2. The other part is expanded in valve f and then supplied as coolant via line 11" to the upper part of column T1. The heated coolant delivered from column T1 is then admixed in line 10' in front of heat exchanger E2. Under certain circumstances, it is necessary that to provide additional cooling, then liquid nitrogen is admixed via line 12 into line 2'. Instead of supplying liquid nitrogen via line 12, it is also contemplated to integrate an expansion turbine in the carbon monoxide cooling cycle.

Compared to known methods of the prior art, the invention has major advantages. Thus, the fact that an impure $CH_4$ fraction is recovered at the bottom of separating column T2 requires a much smaller carbon monoxide cooling cycle, since under certain circumstances, the heating of separating column T2 can be abandoned. In other words, the $CO$—$CH_4$ equilibrium is such that it is possible to obtain a $CH_4$-rich bottom liquid without a separate reboiler. In contrast to the case where the $CO/CH_4$-stream is fed to the column T2 via conduit 13", thereby requiring a reboiler, if the CO/CH$_4$-stream is fed to the column T2 via conduit 13" and this e.g. is possible for a CO/CH$_4$-stream containing approximately 40 mol-% CH$_4$, then the bottoms liquid will contain approximately 92 to 93 mol-% CH$_4$, which is suitable as the methane scrubbing liquid. The specific energy consumption is accordingly reduced as the result of the lower or unnecessary boiling power for separating column T2.

The now possible combination of methane scrubbing column and hydrogen stripper in one column makes possible a less expensive type of construction compared to the conventional methods. A unit operating with the process according to the invention requires about 80% of the components of a conventional unit with methane scrubbing. Such an approach, as it is described in this invention, is especially advantageous for processes and units with smaller carbon monoxide capacities, especially less than 1000 Nm$^3$/h. The impure CH$_4$ fraction which is recovered at the bottom of separating column T2 and which contains essentially carbon monoxide in addition to methane and the H$_2$-rich fraction which is recovered at the top of column T1 and which likewise contains a few percent of carbon monoxide may adversely affect yield, but this drawback is balanced by the fact that the more expensive system can be replaced. Thus, the carbon monoxide yield achieved in this example is 85.8%.

Referring now to the particular construction of column T1, the FIGURE shows all parts of the combined column; no further chimney-trays or other parts of construction are used. The top part (CH$_4$ scrubbing column) is shown as a combination of trays (the parallel horizontal double lines) and a chiller-coil (stream 11"). The lower part (H$_2$ stripper) is shown as a two-packing (or ring) column, with a distributor tray above each packing (not shown). The decision as to whether trays or packings are used depends on the hydraulic situation and the load range in each part of the column, but the depicted configuration of T2 is advantageous for at least the present process. There are 9 theoretical plates in both columns T1 and T2, and in column T1, there are 10 to 25 theoretical plates in the methane scrubbing column and 5 to 10 theoretical plates in the hydrogen stripping column.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for recovering a pure CO fraction from a charge containing at least hydrogen, carbon monoxide and methane, comprising cooling and partially condensing the charge, scrubbing the resultant charge with supercooled liquid methane scrubbing agent to remove carbon monoxide from the charge and provide a liquid containing methane, carbon monoxide and hydrogen, stripping hydrogen from said liquid so as to obtain an enriched CO/CH$_4$ fraction, and subjecting said enriched CO/CH$_4$ fraction to rectification to separate out a pure CO fraction and an enriched CH$_4$ fraction, the improvement which comprises employing as the supercooled liquid methane scrubbing agent, a liquid methane scrubbing agent containing at least 2 to 15 mol % carbon monoxide.

2. A process according to claim 1, wherein the liquid methane scrubbing agent contains 7–10 mol % carbon monoxide.

3. A process according to claim 1, wherein the enriched CH$_4$ fraction recovered by rectification contains CO and is used as the scrubbing agent.

4. A process according to claim 1, wherein water and carbon dioxide have been removed from said charge prior to said cooling of said charge.

* * * * *